United States Patent
Ciprian

(10) Patent No.: US 8,220,222 B2
(45) Date of Patent: Jul. 17, 2012

(54) DEVICE FOR FIXING A LIGHTWEIGHT PANEL ONTO A SUPPORT

(75) Inventor: Danilo Ciprian, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 543 days.

(21) Appl. No.: 12/088,369

(22) PCT Filed: Sep. 27, 2006

(86) PCT No.: PCT/FR2006/050946
§ 371 (c)(1),
(2), (4) Date: Jul. 28, 2008

(87) PCT Pub. No.: WO2007/036673
PCT Pub. Date: Apr. 5, 2007

(65) Prior Publication Data
US 2008/0302060 A1 Dec. 11, 2008

(30) Foreign Application Priority Data
Sep. 28, 2005 (FR) ...................................... 05 52927

(51) Int. Cl.
*E04C 2/54* (2006.01)
(52) U.S. Cl. ....... 52/787.1; 411/353; 411/183; 411/546; 296/191; 244/118.6
(58) Field of Classification Search ................. 52/787.1, 52/787.12, 704, 707, 309.2; 411/500, 501, 411/352, 353, 180, 181, 183, 546; 296/191; 244/118.6, 118.5, 118.1, 120, 131
See application file for complete search history.

(56) References Cited

U.S. PATENT DOCUMENTS

| | | | | |
|---|---|---|---|---|
| 3,137,887 A | * | 6/1964 | Mannino et al. | ................. 16/2.1 |
| 3,296,765 A | * | 1/1967 | Rohe et al. | ................. 52/787.12 |
| 3,526,072 A | * | 9/1970 | Campbell | ................. 52/787.1 |
| 3,765,465 A | * | 10/1973 | Gulistan | ....................... 411/353 |
| 4,399,642 A | | 8/1983 | Bard et al. | |
| 4,481,702 A | * | 11/1984 | Mitchell | ......................... 29/432 |
| 4,557,100 A | * | 12/1985 | Gorges | ...................... 52/787.12 |
| 4,878,795 A | * | 11/1989 | Woodrow et al. | ............. 411/501 |
| 5,078,294 A | * | 1/1992 | Staubli | .......................... 220/233 |
| 5,230,485 A | | 7/1993 | Vogg et al. | |
| 6,055,790 A | * | 5/2000 | Lunde et al. | ................. 52/787.1 |

FOREIGN PATENT DOCUMENTS
FR 2864940 A1 7/2005
* cited by examiner

Primary Examiner — David Dunn
Assistant Examiner — Chi Q Nguyen
(74) Attorney, Agent, or Firm — Perman & Green, LLP

(57) ABSTRACT

These disclosed embodiments relates to a device for fixing a light-weight panel onto a support. Such device includes an insert including at least one flange, such insert being intended for receiving a fixing device of the bolt type.

According to the disclosed embodiments, such flange has an outer surface including toothing elements and the device includes a part made of a ductile material including an opening for the passage of the fixing member. The toothing elements are intended for cooperating, upon fixing the panel onto the support, with the part made of a ductile material to allow such fixing without causing any deformation of the panel.

11 Claims, 2 Drawing Sheets

DEVICE FOR FIXING A LIGHTWEIGHT
PANEL ONTO A SUPPORT

CROSS-REFERENCE TO RELATED APPLICATIONS

This application is the National Stage of International Application No. PCT/FR2006/050946, International Filing Date, 2006 Sep. 27, which designated the United States of America, and which international application was published under PCT Article 21(2) as WO Publication No. WO 2007/036673 A1 and which claims priority from French Application No. 0552927, filed 2005 Sep. 28, the disclosures of each being incorporated by reference in their entirety.

BACKGROUND

The aspects of the disclosed embodiments relate to a device for fixing a light-weight panel such as a sandwich structure panel onto a support. Another object of the aspects of the disclosed embodiments is a vehicle for transporting passengers such as an aircraft, comprising such fixing devices.

BRIEF DESCRIPTION OF THE DRAWINGS

Sandwich structures made of a composite material have exceptional, more particularly mechanical, properties for a minimum weight. Such structures are thus extensively used in the aeronautical industry (hatches, floors, leading edges, ailerons, walls, etc.).

Figure 1:
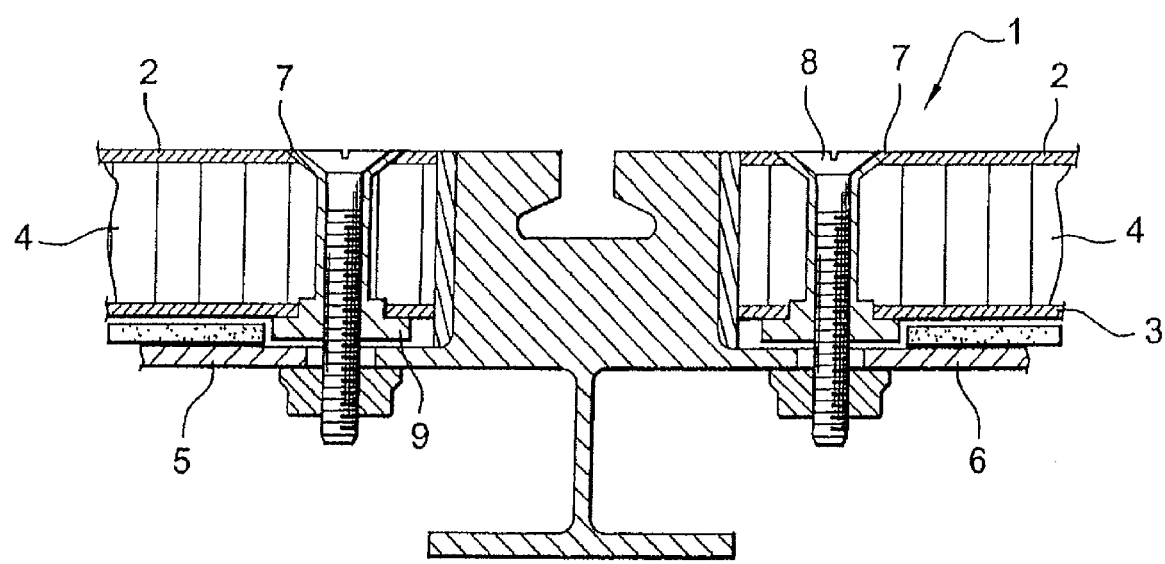
FIG. 1 schematically shows a partial cross-sectional view of a cabin floor of the prior art. The floor is made of sandwich structure floor panels 1. Each panel 1 includes at least two walls 2, 3 positioned on opposite outer faces of a honeycomb core 4, respectively. Such floor panels 1 which have a small thickness, typically of the order of 10 mm, are fixed onto the side flanges 5, 6 of seat assembling rails using bolts.

The panel 1 also comprises local reinforcing parts or inserts 7 for providing the interface between the bolts and the sandwich structure. A local filling of the panel or the positioning of an insert can be used for providing such reinforcement. A recess is typically formed using a tool cutting in one of the walls 2, 3 and in a large part of the honeycomb core 4 thickness for placing such insert in the panel. A metallic insert 7 comprising a body 8 and a flange 9, or large head, is positioned in such recess so that the flange 9 covers the outer surface of the wall 2 which includes the orifice. An adhesive layer may be positioned between the flange 9 and the outer surface of the wall 3 to provide the sealing of the sandwich structure 1. Such large head 9 advantageously allows the distribution of a local stress such as the one generated by a bolt on a relatively large area of the wall 2, 3.

Of course, the recess may be a through hole, cut out in each wall 2, 3 so that the body of the insert 7 goes through the whole thickness of the honeycomb core 4.

It is known to leave sufficient clearance around bores provided on the panel supports intended for receiving the bolts, in order to allow for the assembling of a panel with the support, with manufacturing limits, and to allow for interchangeability, if need be. Besides, a sealing gasket may be placed between the panel and the support, for example at the junction of two panels, thus spacing the insert 7 from the support by the same distance. An important part of the bolt stem is not trapped and is likely to induce stresses on the insert 7 upon the assembling of the panel onto the support. The stresses exerted on the insert 7 may embrittle the honeycomb core of the sandwich structure, which may entail a severe deterioration of the mechanical properties of the panel.

SUMMARY

The aim of the disclosed embodiments is thus to provide a device for fixing an economic, light-weight panel having simple design and implementation, having a high resistance to corrosion while having a minimum weight and making it possible to assemble a light-weight panel onto a support without damaging such panel or the fixing member.

For this purpose, the disclosed embodiments relate to a device for fixing a light-weight panel such as a sandwich structure panel onto a support, compatible with the manufacturing limits and providing interchangeability, if need be while allowing the transfer of heavy loads in the plane of the panel between such panel and the support.

Such device comprises an insert including a hollow main body and at least one flange intended for resting at least partially onto a face of the panel, the insert being intended for receiving a fixing member.

According to the disclosed embodiments, the flange has an outer surface comprising toothing elements and the device comprises a part made of a ductile material, including an opening for the passage of the fixing member. Such part is intended for being placed between the outer surface of the flange and the support which the panel is to be fixed on. The toothing elements are intended for cooperating, upon fixing said panel onto the support, with the part made of a ductile material to realize such fixing without causing any deformation of the panel.

Here, the terms "ductile material" mean a soft material capable of an irreversible plastic deformation, under a stress. The teeth thus deform the part made of a ductile material by transmitting the efforts inherent in the fixing of the panel onto such part, so as not to cause any deformation of the panel.

Upon disassembling the panel, such part made of a ductile material may advantageously be replaced by the operator, for a minimum cost.

The light-weight panel is typically a sandwich structure panel having a foam core or a honeycomb core.

In various particular embodiments of such floor panel, each one having particular advantages and being capable of many possible technical combinations:

at least the flange is made of a hard metallic material, the insert is a one-piece part made of a hard metallic material, the hard metallic material is selected from the group including steel, titanium, invar, an aluminium alloy.

Another object of the disclosed embodiments is also a vehicle for transporting passengers such as an aircraft, including panels integral with panel supports. According to the disclosed embodiments, such vehicle comprises devices for fixing a panel as described above, embodying the assembly of at least one of said panels onto at least one of said supports

BRIEF DESCRIPTION OF THE DRAWINGS

Figure 2:
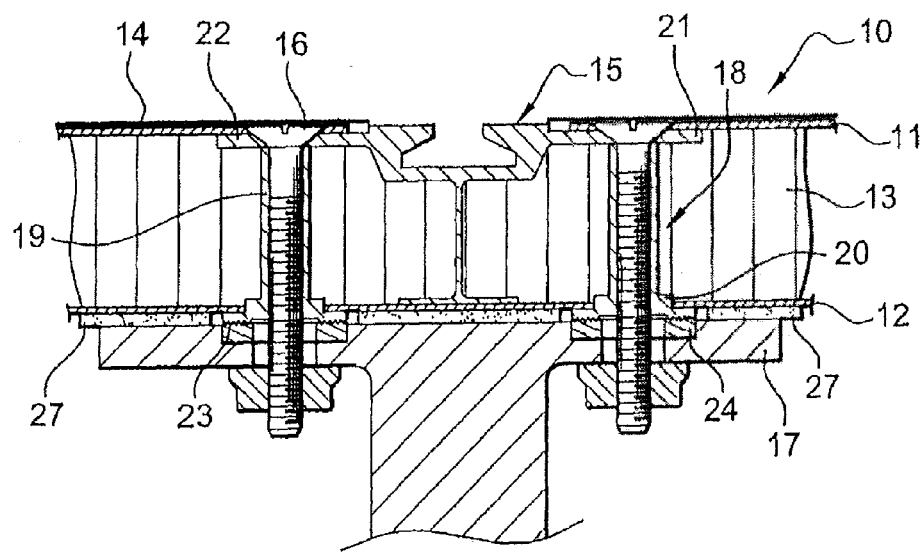
Figure 3:
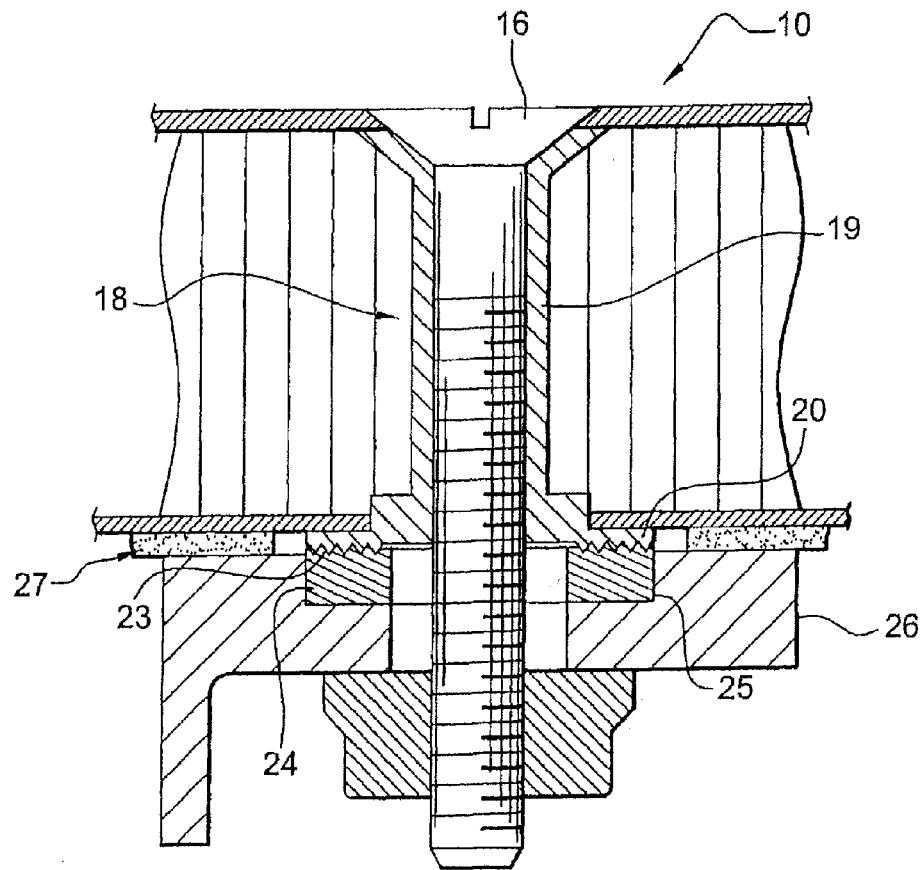

The disclosed embodiments will be described in greater details while referring to the appended drawings in which:

FIG. 1 schematically shows a partial cross-sectional view of a cabin floor of the prior art;

FIG. 2 schematically shows a partial cross-sectional view of a cabin floor for a vehicle for transporting passengers including a device for fixing such panel according to one embodiment of the disclosed embodiments;

FIG. 3 schematically shows an enlarged cross-sectional view of the connection of the cabin floor with its support, shown in FIG. 2.

DETAILED DESCRIPTION

FIG. 2 shows a floor panel for a vehicle transporting passengers according to one embodiment of the disclosed embodiments. The floor panel 10 includes a core sandwich structure comprising at least two walls 11, 12 positioned on opposite outer faces of a honeycomb core 13, respectively.

Such walls 11, 12 are fibre webs. The fibres may be selected from the non limitative group comprising carbon fibres, graphite fibres, glass fibres, silica fibres, silicon carbide fibres or any other fibre giving the required rigidity while meeting the light weight constraint related to the aeronautical field.

The honeycomb core 13 is, for example, made of aramid. As a matter of fact, aramid fibres have a low flammability, and a high resistance to rupture and a high modulus of elasticity.

A floor coating 14, for example a pile carpet, is placed on the floor panel 10. Such coating 14 is used for protecting the floor panels 10 and preventing any aggression related to motions or any other aggression related to the persons present in the cabin of the transportation vehicle.

Such floor panel 10 includes at least a rail for assembling fitting elements, and in particular seats 15, having a longitudinal axis, such assembling rail 15 being at least partially inserted into the thickness of the panel. Besides, the same panel 10 may include two or more rails 15 positioned in various locations, in order to allow the arrangement of fittings according to the user's needs.

The assembling rail 15 has a lower section having the shape of an inverted T or a Q. It also has an upper rail section having the shape of a C for receiving means for coupling and fixing fitting elements, and more particularly seat rails.

The upper face of the floor panel 10 has an extended opening positioned along the longitudinal axis of the assembling rail 15 to allow the fixing of the fitting elements.

The floor panel 10 is fixed by means of a fixing member 16 onto a support, which is in this case, a cross-bar 17 for supporting the floor. The fixing member 16 is a bolt made of steel or titanium. One or more layers such as a sealing gasket 27 may be placed between the floor panel and the support 17. Such sealing gasket 27 may be made of metal, a composite material or rubber, if need be.

The panel 10 comprises inserts 18 for providing the interface between the fixing members of the bolt type and the sandwich structure. Each of such inserts 18 comprises a hollow main body 19 for the passage of a fixing member 16 and at least a flange 20 resting on the face of the floor panel intended to contact the support. An adhesive layer may advantageously be provided between the flange and the outer surface of the wall 12 of the floor panel, in order to provide the sealing of the sandwich structure.

The insert 18 is assembled with the sandwich structure so that the main axis of the hollow cylindrical body 19 is centered on a corresponding hole on the side flanges 21, 22, of the seat assembling rail. Such insert 28 is a one-piece part made of a hard metallic material. Preferably, it is made of titanium, steel, Invar, or of an aluminium alloy.

In another embodiment, the insert is not made of a one-piece part, but includes at least a flange 20 made of a hard metallic material fixed to a hollow main body 19 made of a composite material or a plastic material reinforced with carbon fibres. Assembling such flange(s) 20 onto such hollow main body 19 may be obtained by means of an adhesive layer, of the epoxy type, for example.

Such flange has an outer surface comprising toothing elements 23. Toothing is preferably made in a annular way on the outer face of the flange 20 so as to cooperate with a washer 24 made of a ductile material, such as aluminium, for example.

Such washer 24 includes an opening for the passage of the fixing member 16 and is positioned between the outer surface of the flange 20 and the panel support 17.

FIG. 3 shows an enlarged cross-sectional view of the fixing of the light-weight panel of FIG. 2 on its support. The elements of FIG. 3 having the same reference numbers as the elements described in FIG. 2 refer to the same items. A part 24 made of a ductile material is positioned in a housing 25 provided in the floor panel 26 to transfer the stresses applied in the plane of the light-weight panel in the support structure. Such panel support 26 is, for example, a cross-bar. Upon fitting the fixing member 16, such part 24 made of a ductile material is associated with the hollow main body 19 through the deformation of the face of such ductile material in contact with the hollow main body 19.

In order to provide such connection, the hollow main body 19 may have a cylindrical outer surface having embossed elements. Such embossed elements provide additional surfaces for the transmission of stresses to the core of the sandwich structure. For example, they include a spiral. According to an alternative, there may be alternating recesses and protrusions, such protrusions having a square or rectangular section or a section of any other appropriate shape.

When the connection is made, the fixing device of the disclosed embodiments advantageously provides a transfer of the stresses exerted in the plane of the panel in the support structure, without any reaction from the fixing member. Such transfer of stresses allows bores to be provided in the support structure having diameters much greater than the diameters of the fixing members, so as to be compatible with the manufacturing limits and, to allow interchangeability of the light-weight panels, if need be.

The invention claimed is:

1. A device for fixing a light-weight panel onto a support, said device comprising:
    an insert including a hollow main body and at least one flange configured for resting at least partially onto a face of said panel, said insert being configured for receiving a fixing member, and said flange has an outer surface including toothing elements,
    a part made of a ductile material, the part including an opening for the passage of said fixing member, said part being located between the outer surface of said flange and said support,
    wherein said toothing elements are configured to cooperate, upon fixing said panel onto the support, with said part to realize such fixing without causing any deformation of said panel.

2. A device according to claim 1, comprising that at least said flange is made of a hard metallic material.

3. A device according to claim 2, comprising that the insert is a one-piece part made of a hard metallic material.

4. A device according to claim 2, comprising that said hard metallic material is selected from the group including steel, titanium, invar, an aluminium alloy.

5. A device according to claim 1, comprising that said hollow main body has a cylindrical outer surface with embossed elements.

6. A device according to claim 1, comprising that said part made of a ductile material is a washer.

7. A device according to claim 6, comprising that said washer is made of aluminium.

8. A vehicle for transporting passengers, including panels integral with panel supports, comprising devices for fixing a panel according to claim 1 embodying an assembling of at least one of said panels onto at least one of said supports.

9. A vehicle according to claim 8, comprising that panel supports are cross-bars.

10. A vehicle according to claim 8, comprising that said panels include floor panels each including at least an assembling rail having a longitudinal axis at least partially inserted into the thickness of said panel.

11. A vehicle according to claim 8, wherein said vehicle is an aircraft.

* * * * *